(12) United States Patent
Stewart

(10) Patent No.: US 9,719,489 B2
(45) Date of Patent: Aug. 1, 2017

(54) WIND TURBINE ROTOR BLADE ASSEMBLY HAVING REINFORCEMENT ASSEMBLY

(71) Applicant: General Electric Company, Schenectady, NY (US)

(72) Inventor: Edward McBeth Stewart, Greenville, SC (US)

(73) Assignee: General Electric Company, Schenectady, NY (US)

( * ) Notice: Subject to any disclaimer, the term of this patent is extended or adjusted under 35 U.S.C. 154(b) by 963 days.

(21) Appl. No.: 13/899,654

(22) Filed: May 22, 2013

(65) Prior Publication Data

US 2014/0348659 A1 Nov. 27, 2014

(51) Int. Cl.
*F01D 5/14* (2006.01)
*F03D 1/06* (2006.01)

(52) U.S. Cl.
CPC ........ *F03D 1/0675* (2013.01); *F05B 2230/80* (2013.01); *F05B 2240/302* (2013.01); *Y02E 10/721* (2013.01); *Y02P 70/523* (2015.11); *Y10T 29/49337* (2015.01)

(58) Field of Classification Search
CPC ........................... F03D 1/0675; F05B 2230/80
See application file for complete search history.

(56) References Cited

U.S. PATENT DOCUMENTS

| | | | | |
|---|---|---|---|---|
| 4,806,077 A * | 2/1989 | Bost | ...................... | B64C 27/473 416/144 |
| 7,244,102 B2 * | 7/2007 | Delucis | ................. | F03D 1/0658 415/908 |
| 7,811,063 B2 * | 10/2010 | Bonnet | ................. | F03D 1/0675 416/229 R |
| 7,814,729 B2 | 10/2010 | Normand et al. | | |
| 7,927,077 B2 * | 4/2011 | Olson | ..................... | B29C 73/10 156/94 |
| 8,043,067 B2 * | 10/2011 | Kuroiwa | ............... | F03D 1/0675 416/223 R |
| 8,172,542 B2 * | 5/2012 | Hirano | .................. | F03D 1/0675 416/226 |
| 8,789,275 B2 * | 7/2014 | Esaki | .................... | F03D 1/0675 29/889.7 |
| 8,870,547 B2 * | 10/2014 | Grase | ........................ | B64C 1/06 416/226 |
| 2009/0324412 A1 * | 12/2009 | Roorda | ................. | F03D 1/0658 416/204 R |
| 2010/0239865 A1 | 9/2010 | Kallinen | | |

(Continued)

FOREIGN PATENT DOCUMENTS

EP 2508326 A1 10/2012

*Primary Examiner* — Gregory Anderson
*Assistant Examiner* — Jason Fountain
(74) *Attorney, Agent, or Firm* — Dority & Manning, P.A.

(57) ABSTRACT

Rotor blade assembly and methods for forming rotor blade assemblies are provided. A rotor blade assembly includes a rotor blade including a shell and defining a pressure side, a suction side, a leading edge and a trailing edge each extending between a tip and a root. The rotor blade further defines a span and a chord. The shell includes an inner skin, an outer skin, and a core disposed between the inner skin and the outer skin. The rotor blade assembly further includes a reinforcement assembly bonded to the shell, the reinforcement assembly comprising a reinforcement core.

9 Claims, 6 Drawing Sheets

(56) References Cited

U.S. PATENT DOCUMENTS

| | | | | |
|---|---|---|---|---|
| 2011/0031757 A1* | 2/2011 | Mitsuoka | ............. | F03D 1/0675 290/55 |
| 2011/0116935 A1* | 5/2011 | Wansink | ............... | B29C 66/727 416/229 R |
| 2013/0334735 A1* | 12/2013 | Casazza | ................ | B29C 70/443 264/258 |

* cited by examiner

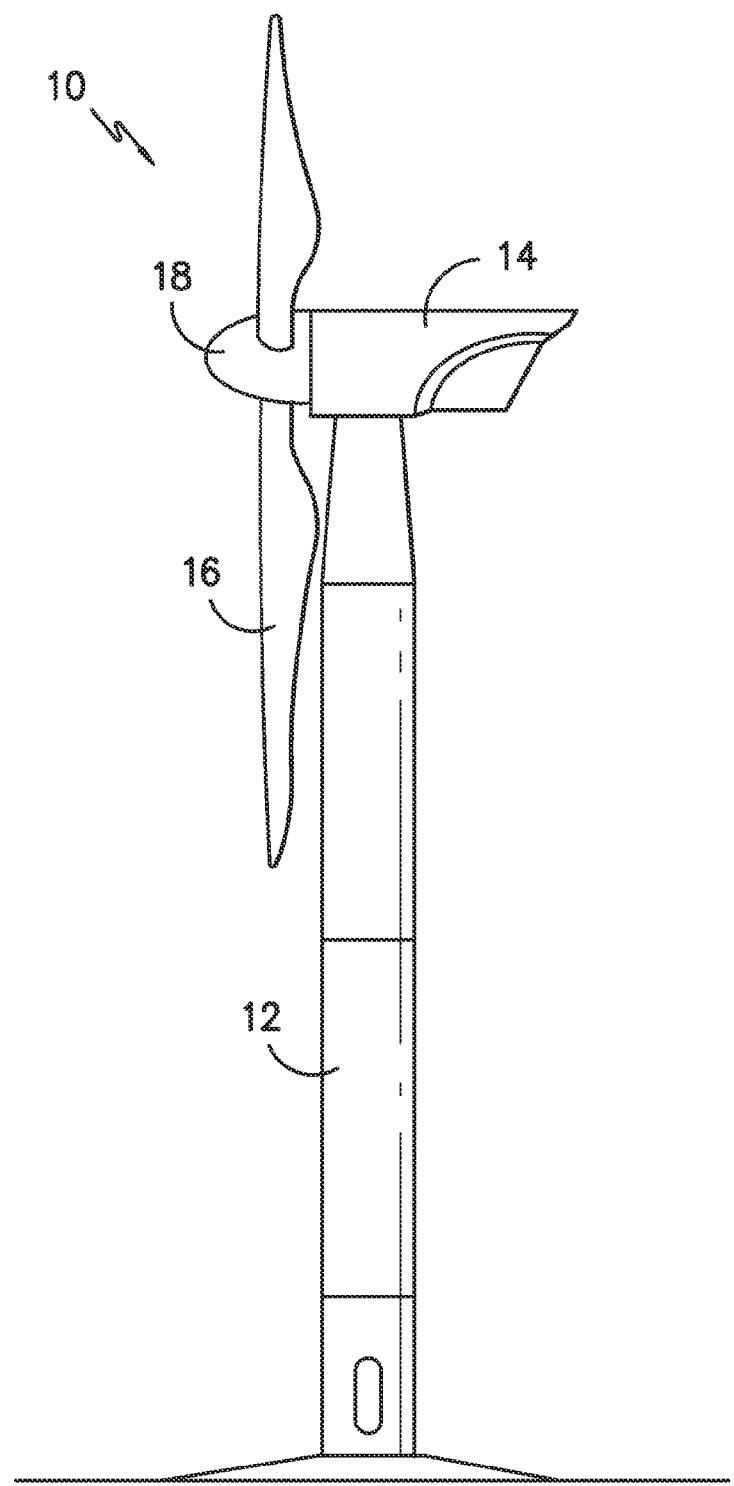
FIG. -1-

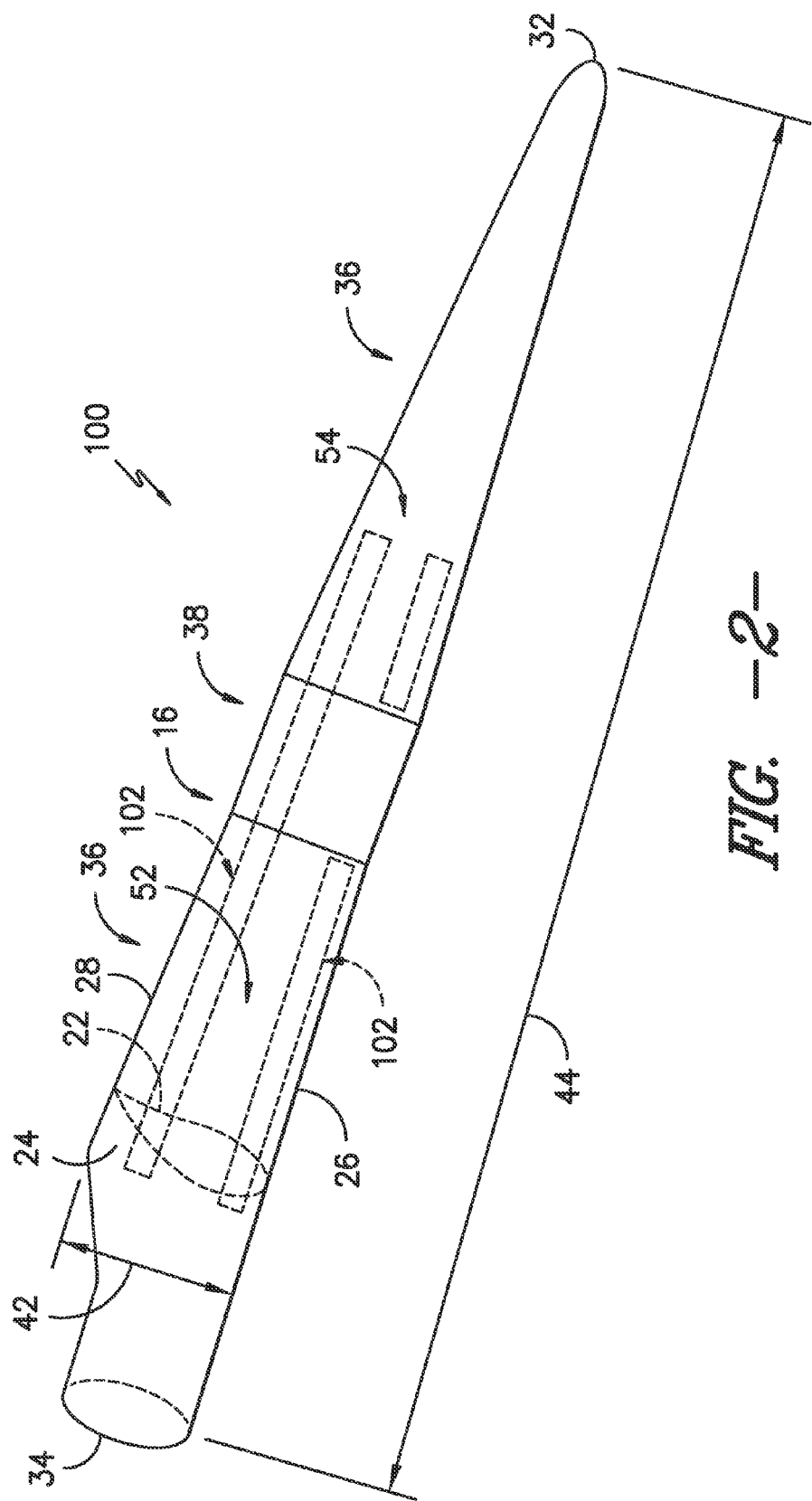
FIG. -2-

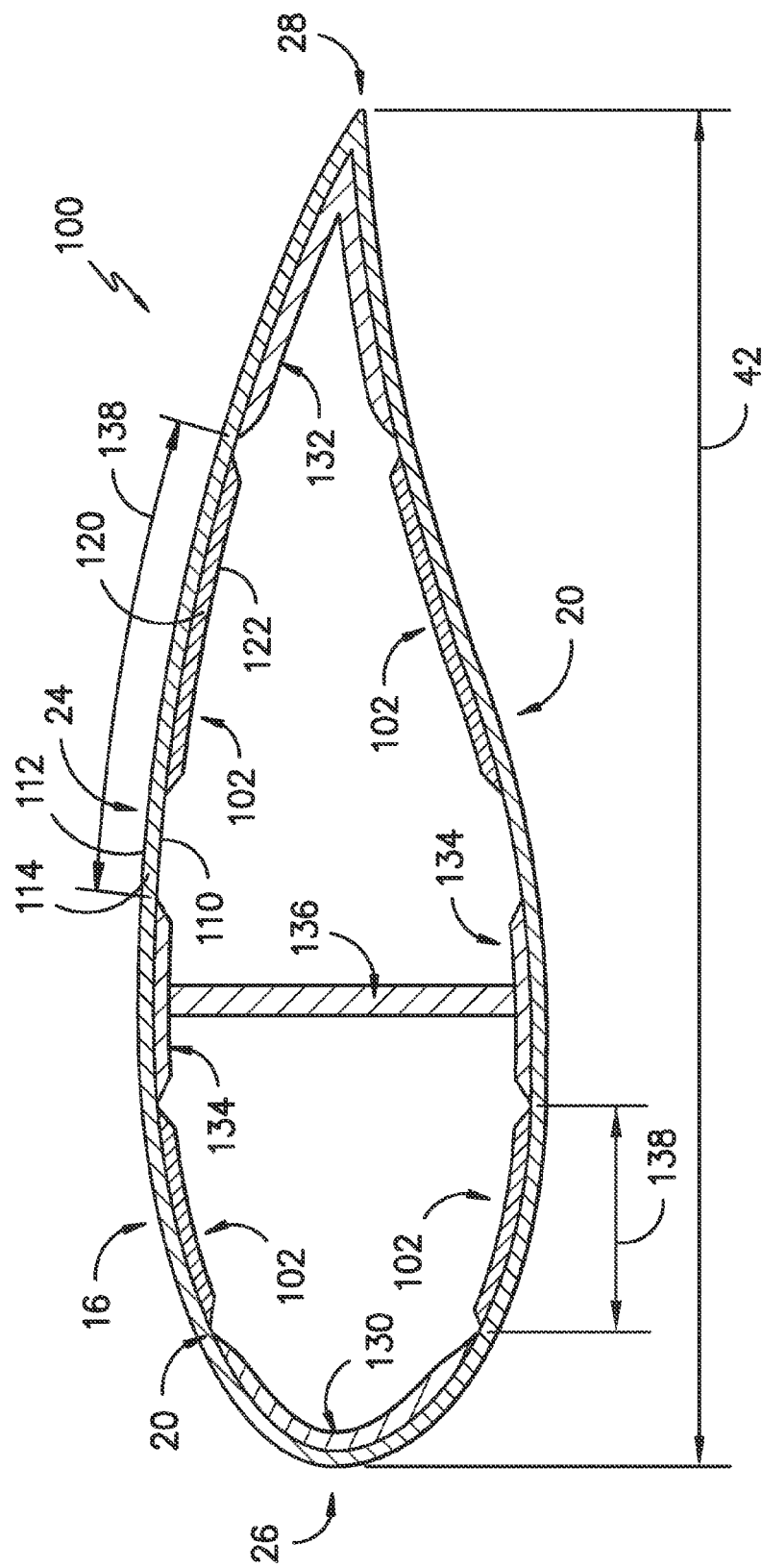
FIG. -3-

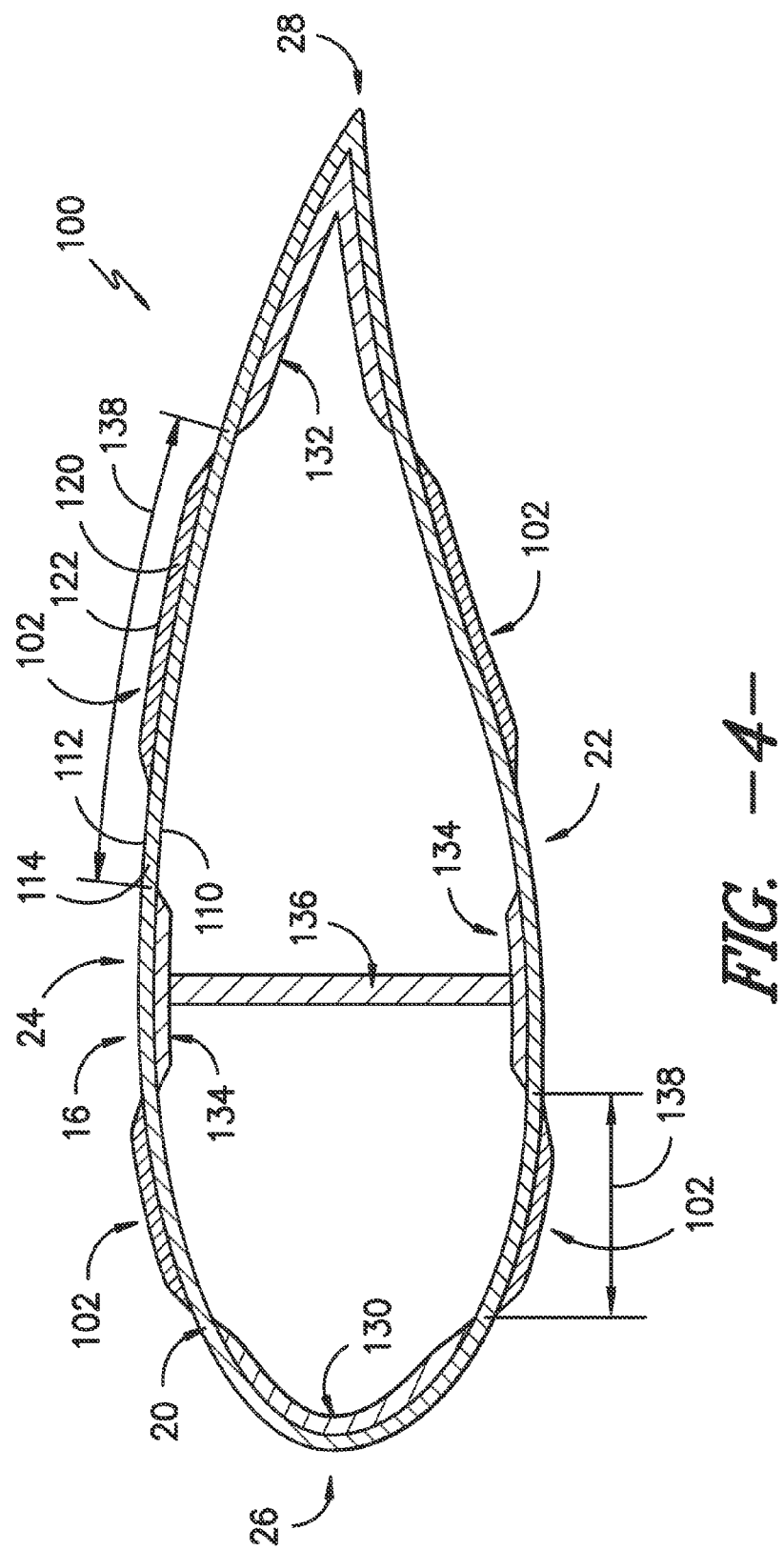
FIG. -4-

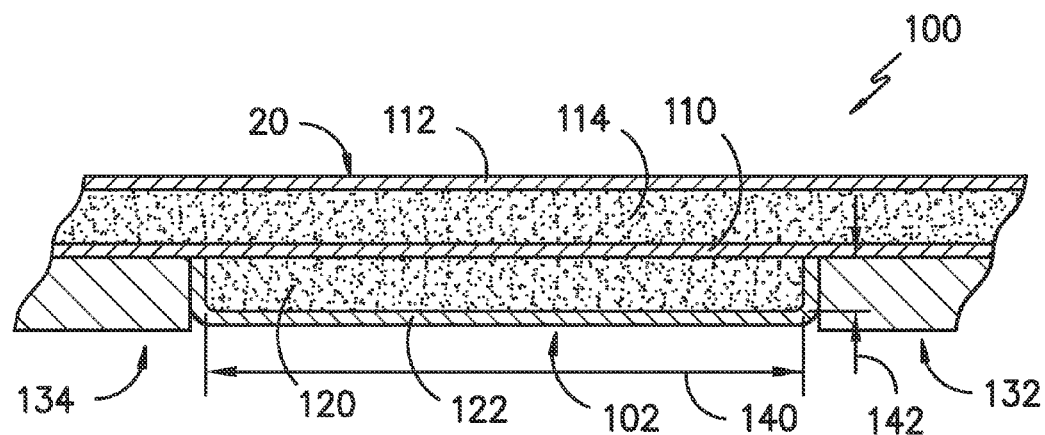
FIG. -5-
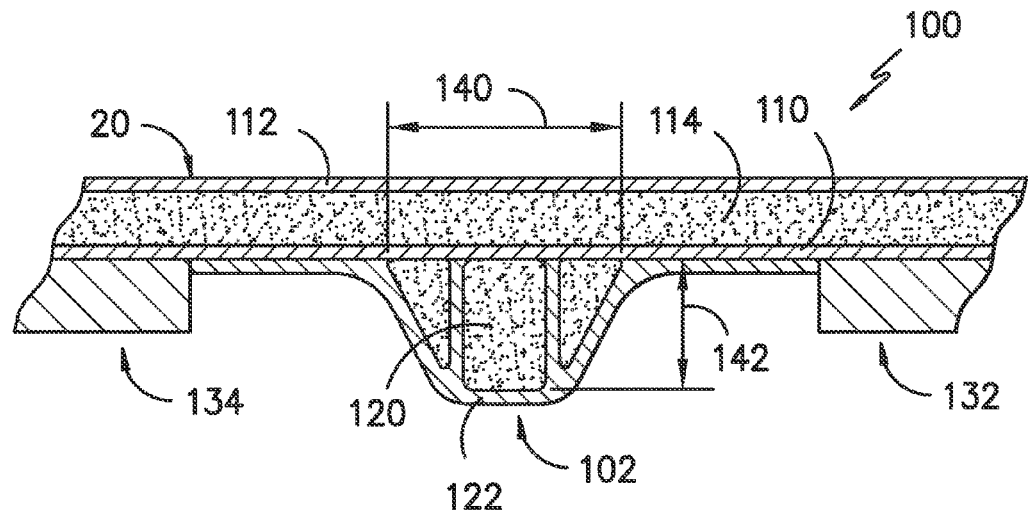
FIG. -6-
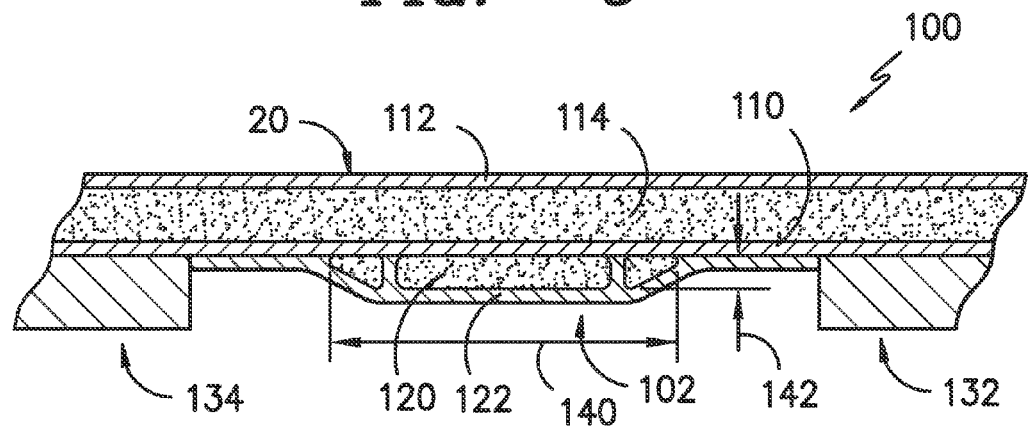
FIG. -7-

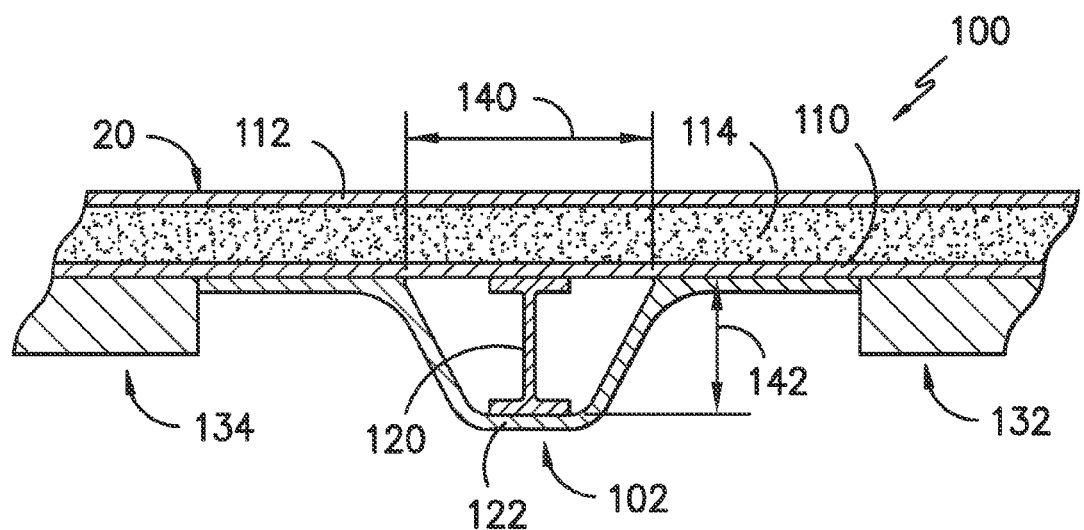
FIG. -8-
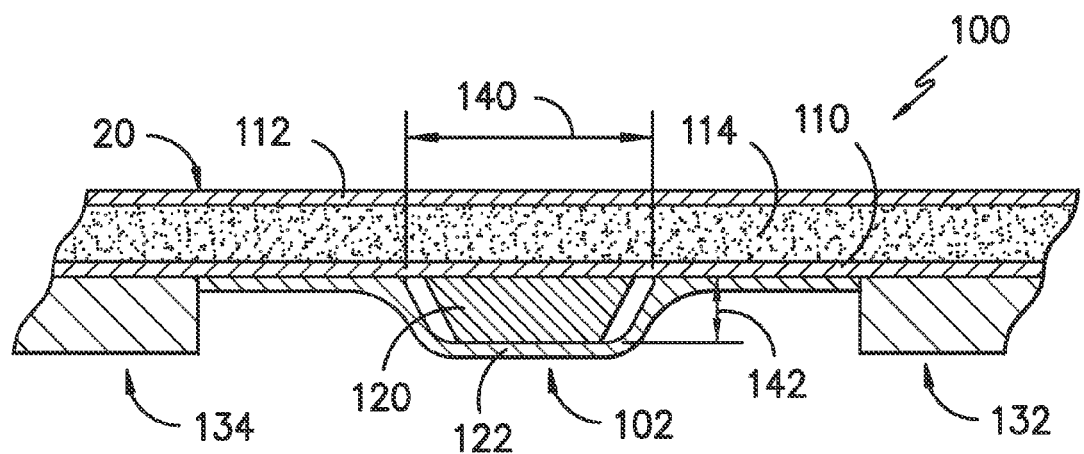
FIG. -9-

WIND TURBINE ROTOR BLADE ASSEMBLY HAVING REINFORCEMENT ASSEMBLY

FIELD OF THE INVENTION

The present disclosure relates in general to wind turbines, and more specifically to rotor blade assemblies therefor which include reinforcement assemblies.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The size, shape, and weight of rotor blades are factors that contribute to energy efficiencies of wind turbines. An increase in rotor blade size increases the energy production of a wind turbine, while a decrease in weight also furthers the efficiency of a wind turbine. Furthermore, as rotor blade sizes grow, extra attention needs to be given to the structural integrity of the rotor blades. Presently, large commercial wind turbines in existence and in development are capable of generating from about 1.5 to about 12.5 megawatts of power. These larger wind turbines may have rotor blade assemblies larger than 90 meters in diameter. Additionally, advances in rotor blade shape encourage the manufacture of a forward swept-shaped rotor blade having a general arcuate contour from the root to the tip of the blade, providing improved aerodynamics. Accordingly, efforts to increase rotor blade size, decrease rotor blade weight, and increase rotor blade strength, while also improving rotor blade aerodynamics, aid in the continuing growth of wind turbine technology and the adoption of wind energy as an alternative energy source.

One known strategy for reducing the costs of pre-forming, transporting, and erecting wind turbines having rotor blades of increasing sizes is to manufacture the rotor blades in blade segments. The blade segments may be assembled to form the rotor blade after, for example, the individual blade segments are transported to an erection location. Further, in many cases where increased rotor blade sizes are desired, it may be desirable to increase the lengths of existing rotor blades. For example, an existing rotor blade may be divided into segments, and an insert may be provided between neighboring segments to increase the length of the segments.

However, there are concerns associated with such strategies for increasing the size of rotor blades. Particularly when increasing the lengths of existing rotor blades, the structural integrity of such rotor blades is of concern. For example, the existing rotor blade structure may not be sufficient to support the increase in weight due to the addition of an insert to increase the rotor blade size. Additionally, stress concentrations may exist between various segments of a rotor blade that is formed from multiple components.

Various strategies are known for reinforcing rotor blades to ensure the structural integrity thereof. For example, the thickness of the aerodynamic design forming the rotor blade has been increased. However, such increase involves various system performance changes, can substantially increase the weight of the rotor blade, and cannot be utilized when increasing the length of existing rotor blades. Another strategy involves applying glass plies to existing rotor blade shells. However, such strategy has been found to significantly increase the weight of the rotor blade and require an inefficient manufacturing process.

Accordingly, improved wind turbine rotor blades are desired in the art. In particular, rotor blades with improved reinforcement capabilities would be advantageous. Specifically, rotor blades formed from multiple components which include improved reinforcement capabilities are desired in the art.

BRIEF DESCRIPTION OF THE INVENTION

Aspects and advantages of the invention will be set forth in part in the following description, or may be obvious from the description, or may be learned through practice of the invention.

In one embodiment, a rotor blade assembly is disclosed. The rotor blade assembly includes a rotor blade including a shell and defining a pressure side, a suction side, a leading edge and a trailing edge each extending between a tip and a root. The rotor blade further defines a span and a chord. The shell includes an inner skin, an outer skin, and a core disposed between the inner skin and the outer skin. The rotor blade assembly further includes a reinforcement assembly bonded to the shell, the reinforcement assembly comprising a reinforcement core.

In another embodiment, a method for forming a rotor blade assembly is provided. The method includes forming a rotor blade. The rotor blade includes a shell and defines a pressure side, a suction side, a leading edge and a trailing edge each extending between a tip and a root. The rotor blade further defines a span and a chord. The shell includes an inner skin, an outer skin, and a core disposed between the inner skin and the outer skin. The method further includes bonding a reinforcement assembly to the shell, the reinforcement assembly comprising a reinforcement core.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a side view of a wind turbine according to one embodiment of the present disclosure;

FIG. 2 is a top view of a rotor blade assembly according to one embodiment of the present disclosure;

FIG. 3 is a cross-sectional view of a rotor blade assembly according to one embodiment of the present disclosure;

FIG. 4 is a cross-sectional view of a rotor blade assembly according to another embodiment of the present disclosure;

FIG. 5 is a cross-sectional view of a shell and reinforcement assembly of a rotor blade assembly according to one embodiment of the present disclosure;

FIG. 6 is a cross-sectional view of a shell and reinforcement assembly of a rotor blade assembly according to one embodiment of the present disclosure;

FIG. 7 is a cross-sectional view of a shell and reinforcement assembly of a rotor blade assembly according to one embodiment of the present disclosure;

FIG. 8 is a cross-sectional view of a shell and reinforcement assembly of a rotor blade assembly according to one embodiment of the present disclosure; and FIG. 9 is a cross-sectional view of a shell and reinforcement assembly of a rotor blade assembly according to one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring now to FIG. 2, a rotor blade 16 according to the present disclosure may include shell 20 from which the rotor blade 16 shape is formed, and may include exterior surfaces defining a pressure side 22 and a suction side 24 extending between a leading edge 26 and a trailing edge 28. These surfaces may extend from a blade tip 32 to a blade root 34. The exterior surfaces may be generally aerodynamic surfaces having generally aerodynamic contours, as is generally known in the art.

In some embodiments, the rotor blade 16 may include a plurality of individual blade segments 36 aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

Further, in some embodiments as shown, one or more of the blade segments 36 may be an insert 38. The insert 38 may be provided between segments 36 of an existing rotor blade 16 during a retrofit operation to lengthen the existing rotor blade 16. It should be noted that any suitable methods or apparatus may be utilized to join the various segments 36 together to form a rotor blade 16.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define chord 42 and a span 44. As shown in FIGS. 2 and 3, the chord 42 may vary throughout the span 44 of the rotor blade 16. Thus, a local chord may be defined for the rotor blade 16 at any point on the rotor blade 16 along the span 44.

Additionally, the rotor blade 16 may define an inboard area 52 and an outboard area 54. The inboard area 52 may be a span-wise portion of the rotor blade 16 extending from the root 34. For example, the inboard area 52 may, in some embodiments, include approximately 25%, 33%, 40%, 50%, 60%, 67%, 75% or any percentage or range of percentages therebetween, or any other suitable percentage or range of percentages, of the span 44 from the root 34. The outboard area 54 may be a span-wise portion of the rotor blade 16 extending from the tip 32, and may in some embodiments include the remaining portion of the rotor blade 16 between the inboard area 52 and the tip 32. Additionally or alternatively, the outboard area 54 may, in some embodiments, include approximately 25% 33%, 40%, 50%, 60%, 67%, 75% or any percentage or range of percentages therebetween, or any other suitable percentage or range of percentages, of the span 44 from the tip 32.

As illustrated in FIGS. 2 through 9, the present disclosure may further be directed to one or more rotor blade assemblies 100. A rotor blade assembly according to the present disclosure generally includes one or more reinforcement features. Such reinforcement features advantageously reinforce the rotor blade 16, reducing buckling and other structural integrity concerns. Such reinforcement features are particularly useful when forming rotor blades 16 from multiple blade segments 36, in particular when lengthening an existing rotor blade 16 through the use of an insert 38 between existing segments 26 of an existing rotor blade 16.

Thus, a rotor blade assembly 100 according to the present disclosure includes a rotor blade 16 and one or more reinforcement assemblies 102. Each reinforcement assembly 102 may be bonded to the shell 20 to reinforce the rotor blade 16. For example, as shown, the shell 20 of the rotor blade 16 may include an inner skin 110, an outer skin 112, and a core 114. The core 114 may be disposed between the inner skin 110 and the outer skin 112. The reinforcement assembly 102 may be bonded to the shell 20, and may itself include at least one reinforcement core 120 and, optionally, at least one reinforcement skin 122. A reinforcement assembly 102 may in exemplary embodiments be disposed on the interior of the rotor blade 16, as shown in FIG. 3. Alternatively, however, a reinforcement assembly 102 may be disposed on the exterior of the rotor blade 16, as shown in FIG. 4. Thus, the reinforcement core 120 may be disposed between the reinforcement skin 122 and either the inner skin 110, as shown in FIG. 3, or the outer skin 112, as shown in FIG. 4.

It should be understood that the present disclosure is not limited to reinforcement assemblies 102 having only a single reinforcement core 120 and a single reinforcement skin 122. Rather, any suitable number of cores 120 and skins 122 is within the scope and spirit of the present disclosure. For example, two or more cores 120 and/or two or more skins 122 may be utilized, and may be arranged in alternating or side-by-side fashion as desired or required. Further, for example, in some embodiments, a skin 122 may be disposed between a reinforcement core 120 and the inner skin 110 or outer skin 112, and this skin 122 may be bonded to the inner skin 110 or outer skin 112 rather than a core 120 as shown.

The inner skin 110, outer skin 112, and reinforcement skin 122 may be formed from any suitable materials. In some exemplary embodiments, for example, any one or more of the skins 110, 112, 122 may be formed from a plastic, such as a fiber reinforced plastic. In particular, glass fiber reinforced plastics may be utilized. In other exemplary embodiments, any one or more of the skins 110, 112, 122 may be formed from carbon fiber or another suitable composite material. In still other exemplary embodiments, any one or more of the skins 110, 112, 122 may be formed from a suitable metal.

The core 114 and reinforcement core 120 may additionally be formed from any suitable materials. In some exemplary embodiments, for example, any one or more of the cores 114, 120 may be formed from a foam. In other exemplary embodiments, any one or more of the cores 114, 120 may be formed from wood, such as balsa wood or another suitable wood material. In still other exemplary embodiments, any one or more of the cores 114, 120 may be formed from a suitable metal, which may for example have a honeycomb or other suitable structure.

In still other embodiments, as shown in FIGS. 8 and 9, the reinforcement core 120 may be a beam, such as a suitable structural beam formed from for example a suitable metal material. The beam may be an I-beam having a generally I-shaped cross-sectional shape, as illustrated in FIG. 8, or may be a closed beam having a suitable polygonal shape, as illustrated is FIG. 9, or may have any other suitable cross-sectional shape.

It should be understood that the present disclosure is not limited to the above disclosed materials utilized to form the skins 110, 112, 122 and cores 114, 120, and rather that any suitable materials are within the scope and spirit of the present disclosure.

A reinforcement assembly 102 according to the present disclosure may typically be bonded to the pressure side 22 or the suction side 24, as shown. In exemplary embodiments, as shown, a reinforcement assembly 102 may be bonded to the suction side 24. Further, in exemplary embodiments, a reinforcement assembly 102 may be bonded to the shell 20 proximate the trailing edge 28, although additionally or alternatively a reinforcement assembly 102 may be bonded to the shell 20 proximate the leading edge 26 or at any other suitable location on the shell 20. For example, FIGS. 3 and 4 illustrate a reinforcement assembly 102 bonded to the suction side 24 proximate the trailing edge 28, which may particularly provide structural reinforcement to the rotor blade 16 and rotor blade assembly 100. Additionally, FIGS. 3 and 4 illustrate a reinforcement assembly 102 bonded to the suction side 24 proximate the leading edge, a reinforcement assembly 102 bonded to the pressure side 22 proximate the trailing edge 28, and a reinforcement assembly 102 bonded to the pressure side 22 proximate the leading edge 26.

In particular, FIGS. 3 and 4 illustrate exemplary locations of reinforcement assemblies 102 bonded to rotor blades 16. For example, as shown, a rotor blade 16 according to the present disclosure may further include a leading edge bonding cap 130, a trailing edge bonding cap 132 or bonded assembly, one or more spar caps 134, and/or one or more shear webs 136. The bonding caps 130, 132 may be respectively bonded to the leading edge 22 and trailing edge 24, typically to the inner skin 110 thereof, to reinforce the leading edge 22 and trailing edge 24. A bonded assembly, which may be utilized instead of a trailing edge bonding cap 132, simply utilizes a suitable bonding paste or adhesive to bond the pressure side 22 and suction side 22 together. A shear web 136 may extend between spar caps 134 bonded to the pressure side 26 and suction side 28, typically to the inner skin 110 thereof, to provide further structural reinforcement. In exemplary embodiments, a reinforcement assembly 102 according to the present disclosure may be bonded to a portion 138 of the shell 20 that extends between, for example, the leading edge bonding cap 130 and a spar cap 134 or the trailing edge bonding cap 130 (or bonded assembly) and a spar cap 134. Additionally or alternatively, however, a reinforcement assembly 102 may be bonded to the shell 20 at the location of, for example, the leading edge bonding cap 130, the trailing edge bonding cap 130, or a spar cap 134. For example, a reinforcement assembly 102 may be bonded to portions 138 adjacent to a spar cap 134 as well as the spar cap 134 itself.

FIGS. 5 through 9 illustrate chord-wise cross-sectional views of various embodiments of reinforcement assemblies 102 bonded to shells 20. As shown, the size of a reinforcement assembly 102, and in particular the core 120 thereof, may vary relative to the shell 20. In particular, in a chord-wise cross-section the aspect ratio of a reinforcement core 120 may be different from the aspect ratio of the core 114 of the portion of the shell 20, such as portion 138, to which it is bonded. As shown in FIGS. 5 through 7, a reinforcement core 120 may define a width 140 and a height 142. In some embodiments as shown in FIG. 5 the width 140 and height 142 may be generally identical to the width and height of the core 114 of portion 138 to which the reinforcement core 120 is bonded. In other embodiments, as shown in FIGS. 6 and 7, the width 140 may be smaller. Additionally, the height 142 may be larger, as shown in FIG. 6, or smaller, as shown in FIG. 7. The widths 140 and heights 142 as discussed herein are in exemplary embodiments maximums for the various components. Thus, the aspect ratios may be generally identical, as shown in FIG. 5, or different, as shown in FIGS. 6 and 7.

Referring again to FIG. 2, a reinforcement assembly 102 may be located along the span-wise direction of the rotor blade 16 within any suitable portion of the rotor blade 16. For example, in some exemplary embodiments, a reinforcement assembly 102 may be disposed between the root 34, which may be considered 0% of the span, and approximately 70% of the span 44 from the root 34. In other embodiments, a reinforcement assembly 102 may be disposed between the root 34 and approximately 60% of the span 44 from the root 34, or between the root 34 and approximately 50% of the span 44 from the root 34. In still other embodiments, a reinforcement assembly 102 may be disposed between the location of maximum chord 42 of the rotor blade 16 and approximately 70% of the span 44 from the root 34, between the location of maximum chord 42 of the rotor blade 16 and approximately 60% of the span 44 from the root 34, or between the location of maximum chord 42 of the rotor blade 16 and approximately 50% of the span 44 from the root 34.

Additionally, a reinforcement assembly 102 may be continuous or discontinuous in the span-wise direction. For example, in embodiments wherein an insert 38 is utilized between segments 36 of an existing rotor blade 16, the insert 38 may include sufficient reinforcement that an additional reinforcement assembly 102 is not required. In these embodiments, a reinforcement assembly 102 may be bonded to various segments 36 in the appropriate span-wise range, but may be discontinuous and thus not applied to the span-wise region of the insert 38. Alternatively, however, a reinforcement assembly 102 may be applied continuously in the span-wise direction through any suitable blade segments 26 and, if included, insert 38.

Further, it should be understood that in exemplary embodiments a reinforcement assembly 102 is retrofit to an existing rotor blade 16. Such retrofit in some embodiments occurs when the rotor blade 16 is lengthened through use of an insert 38, as discussed. In other embodiments, a retrofit may occur after frequent use of a rotor blade 16 to, for example, repair structural damage to the rotor blade 16. It should be understood, however, that the present disclosure is not limited to retrofit applications, and that a reinforcement assembly 102 may be applied during initial construction of a rotor blade 16 if desired or required.

The present disclosure is further directed to methods for forming a rotor blade assembly 100. A method includes the step of, for example, forming a rotor blade 16. Any suitable methods or apparatus may be utilized to form the rotor blade 16, such as for example suitable lay-up techniques, hand lamination, and/or co-infusion, etc. A method further includes the step of, for example, bonding a reinforcement assembly 102 to a shell 20 of the rotor blade 16. Such bonding may be performed using, for example, suitable lay-up techniques, hand lamination, co-infusion, adhesive bonding, or any other suitable bonding technique. Such methods produce improved rotor blade assemblies 100 with improved structural integrity, particularly in the case of retrofit rotor blade assemblies.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for forming a rotor blade assembly, comprising:
   forming a rotor blade comprising a shell and defining a pressure side, a suction side, a leading edge and a trailing edge each extending between a tip and a root, the rotor blade further defining a span and a chord, the shell comprising an inner skin, an outer skin, and a core disposed between the inner skin and the outer skin; and
   retrofitting a reinforcement assembly to the rotor blade, the reinforcement assembly comprising a reinforcement skin and a reinforcement core, wherein the reinforcement core is disposed between the reinforcement skin and one of the inner skin or the outer skin.

2. The method of claim 1, wherein the reinforcement core is disposed between the reinforcement skin and the inner skin.

3. The method of claim 1, further comprising bonding the reinforcement assembly to the shell on the suction side.

4. The method of claim 1, wherein the rotor blade further comprises a plurality of spar caps and a trailing edge bonding cap.

5. The method of claim 4, further comprising bonding the reinforcement assembly to a portion of the shell between the trailing edge bonding cap and one of the plurality of spar caps.

6. The method of claim 4, wherein, in a chord-wise cross-section, an aspect ratio of the reinforcement core is different from an aspect ratio of the core within the portion of the shell between the trailing edge bonding cap and one of the plurality of spar caps.

7. The method of claim 1, wherein the reinforcement assembly is disposed between the root and approximately 70% of the span from the root.

8. The method of claim 1, wherein the inner skin and the outer skin are formed from one of a glass fiber reinforced plastic, a carbon fiber, or a metal.

9. The method of claim 1, wherein the core and the reinforcement core are formed from one of a foam, a wood, or a metal.

* * * * *